(12) United States Patent
Jackson et al.

(10) Patent No.: US 9,100,416 B2
(45) Date of Patent: **\*Aug. 4, 2015**

(54) SYSTEM AND METHOD FOR CONVEYING END-TO-END CALL STATUS

(71) Applicant: AT&T Intellectual Property I, LP, Atlanta, GA (US)

(72) Inventors: James Jackson, Austin, TX (US); Mehrad Yasrebi, Austin, TX (US); Philip Cunetto, Austin, TX (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/287,874

(22) Filed: May 27, 2014

(65) Prior Publication Data

US 2014/0254587 A1 Sep. 11, 2014

Related U.S. Application Data

(63) Continuation of application No. 11/870,850, filed on Oct. 11, 2007, now Pat. No. 8,774,174.

(51) Int. Cl.

| H04L 29/06 | (2006.01) |
|---|---|
| H04M 3/533 | (2006.01) |
| H04M 7/12 | (2006.01) |
| H04L 12/58 | (2006.01) |
| H04L 12/66 | (2006.01) |

(Continued)

(52) U.S. Cl.
CPC .......... *H04L 65/1069* (2013.01); *H04L 12/589* (2013.01); *H04L 65/1006* (2013.01); *H04L 65/1096* (2013.01); *H04M 3/53341* (2013.01); *H04M 7/126* (2013.01); *H04L 12/66* (2013.01); *H04L 29/0638* (2013.01); *H04L 51/36* (2013.01); *H04L 65/1016* (2013.01); *H04M 1/6505* (2013.01); *H04M 3/424* (2013.01); *H04M 2203/4536* (2013.01)

(58) Field of Classification Search
CPC ... H04L 12/589; H04L 12/66; H04L 29/0638; H04L 51/36; H04L 65/1006; H04L 65/1016; H04L 65/1069; H04L 65/1096; H04M 3/424; H04M 7/126; H04M 2203/459
See application file for complete search history.

(56) References Cited

U.S. PATENT DOCUMENTS

| 6,687,359 B1 * | 2/2004 | D'Arcy et al. ........... 379/209.01 |
| 7,386,111 B2 | 6/2008 | Holder |
| 7,417,982 B2 | 8/2008 | Jain et al. |

(Continued)

*Primary Examiner* — Luat Phung
*Assistant Examiner* — Kai Chang
(74) *Attorney, Agent, or Firm* — Guntin & Gust, PLC; Ralph Trementozzi

(57) ABSTRACT

A system that incorporates teachings of the present disclosure may include, for example, receiving a session initiation protocol (SIP) subscribe message over a primary call leg requesting outdial event notification on a secondary call leg. Receiving of the call is responsive to a unified messaging system placing a call outside of its local access and transport area. A call is placed on the secondary call leg responsive to receiving outdial information on the primary call leg. Alternative outdial information directed to the calling party is received responsive to the call on the secondary leg being unanswered. Another call is placed on the secondary leg responsive to receiving the alternative outdial information without requiring receipt of another SIP subscribe message over the primary call leg. A calling card server performs SIP messaging associated with one of the SIP notify message or the SIP subscribe message. Other embodiments are disclosed.

20 Claims, 5 Drawing Sheets

(51) Int. Cl.
   *H04M 1/65*   (2006.01)
   *H04M 3/424*  (2006.01)

(56) References Cited

U.S. PATENT DOCUMENTS

| | | | |
|---|---|---|---|
| 7,486,781 B2 | 2/2009 | Newman et al. | |
| 7,496,190 B1 | 2/2009 | Kung et al. | |
| 7,779,072 B2 * | 8/2010 | Donovan et al. | 709/204 |
| 2003/0053447 A1 | 3/2003 | Thompson | |
| 2003/0118160 A1 | 6/2003 | Holt | |
| 2003/0152203 A1 | 8/2003 | Berger | |
| 2003/0185199 A1 * | 10/2003 | Beyda | 370/352 |
| 2003/0235183 A1 | 12/2003 | Skelton et al. | |
| 2004/0028080 A1 | 2/2004 | Samarasinghe | |
| 2004/0072593 A1 | 4/2004 | Robbins et al. | |
| 2005/0085247 A1 | 4/2005 | Bajko | |
| 2006/0165060 A1 | 7/2006 | Dua | |
| 2006/0262916 A1 | 11/2006 | Marascio | |
| 2006/0268754 A1 | 11/2006 | Ibezim | |
| 2006/0291450 A1 | 12/2006 | Ramachandran | |
| 2007/0027975 A1 | 2/2007 | Tai | |
| 2007/0086439 A1 | 4/2007 | Schneider et al. | |
| 2007/0121608 A1 | 5/2007 | Gu | |
| 2007/0173226 A1 | 7/2007 | Cai | |
| 2007/0280205 A1 * | 12/2007 | Howell et al. | 370/352 |
| 2008/0002820 A1 * | 1/2008 | Shtiegman et al. | 379/211.02 |
| 2008/0062965 A1 * | 3/2008 | Silva et al. | 370/352 |
| 2008/0304495 A1 * | 12/2008 | Jackson et al. | 370/401 |
| 2008/0317001 A1 | 12/2008 | Jackson | |
| 2009/0034696 A1 * | 2/2009 | Ramanathan | 379/88.17 |
| 2009/0034698 A1 | 2/2009 | Karnalkar | |
| 2009/0059897 A1 * | 3/2009 | Anantharaman et al. | 370/352 |

* cited by examiner

200

SYSTEM AND METHOD FOR CONVEYING END-TO-END CALL STATUS

CROSS-REFERENCE TO RELATED APPLICATIONS

This application is a Continuation of and claims priority to U.S. patent application Ser. No. 11/870,850, filed Oct. 11, 2007, by Jackson et al., entitled "System and Method for Conveying End-to-End Call Status." The content of the foregoing is hereby incorporated by reference into this application as if set forth herein in full.

FIELD OF THE DISCLOSURE

The present disclosure relates generally to communication techniques and more specifically to a system and method for conveying end-to-end call status.

BACKGROUND

In a Voice over Internet Protocol (VoIP) network, establishment of an end-to-end call may involve multiple communication legs each providing its own signaling mechanisms. For example, when a Unified Messaging System (UMS) operating in an IP Multimedia Subsystem (IMS) network receives a request from a subscriber to browse voicemails, a common option of the UMS is to provide the subscriber an auto-dial feature to respond to the voicemail message without terminating the call. When the call is outside of the Local Access and Transport Area (LATA) of the UMS, the UMS (due to regulatory reasons) has to re-direct the call to an intermediate system such as a Calling Card Server (CCS) to place the call.

When the CCS places the call to the Called Endpoint, it will typically receive call progress tones via signaling messages. The CCS must then convert those call progress tones into in-band tones for the Calling Endpoint. The UMS under these circumstances does not know whether the Called Endpoint is ringing or a busy signal is being transmitted. This situation can limit the UMS from providing the calling party additional supplemental communication features during the call set-up process.

DETAILED DESCRIPTION

In one embodiment of the present disclosure, a computer-readable storage medium operating in a Calling Card Server (CCS) can have computer instructions for receiving from a Unified Messaging System (UMS) a Session Initiation Protocol (SIP) SUBSCRIBE message over a primary call leg requesting outdial event notification on a secondary call leg, placing a call on the secondary call leg responsive to receiving on the primary call leg outdial information from the UMS, and submitting a SIP NOTIFY message to the UMS that indicates outdial events associated with call status of the call on the secondary call leg.

In one embodiment of the present disclosure, a UMS can have a controller element to submit to a CCS over a primary call leg a SIP SUBSCRIBE message requesting outdial event notification for a call placed on a secondary call leg responsive to a reply of a voicemail message, and receive over the primary call leg a SIP NOTIFY message from the CCS indicating outdial events associated with placing the call over the secondary call leg.

In one embodiment of the present disclosure, a CCS can have a controller to transmit a SIP NOTIFY message to a UMS over a primary call leg. The SIP NOTIFY message can include call status associated with a secondary call leg.

Figure 1:
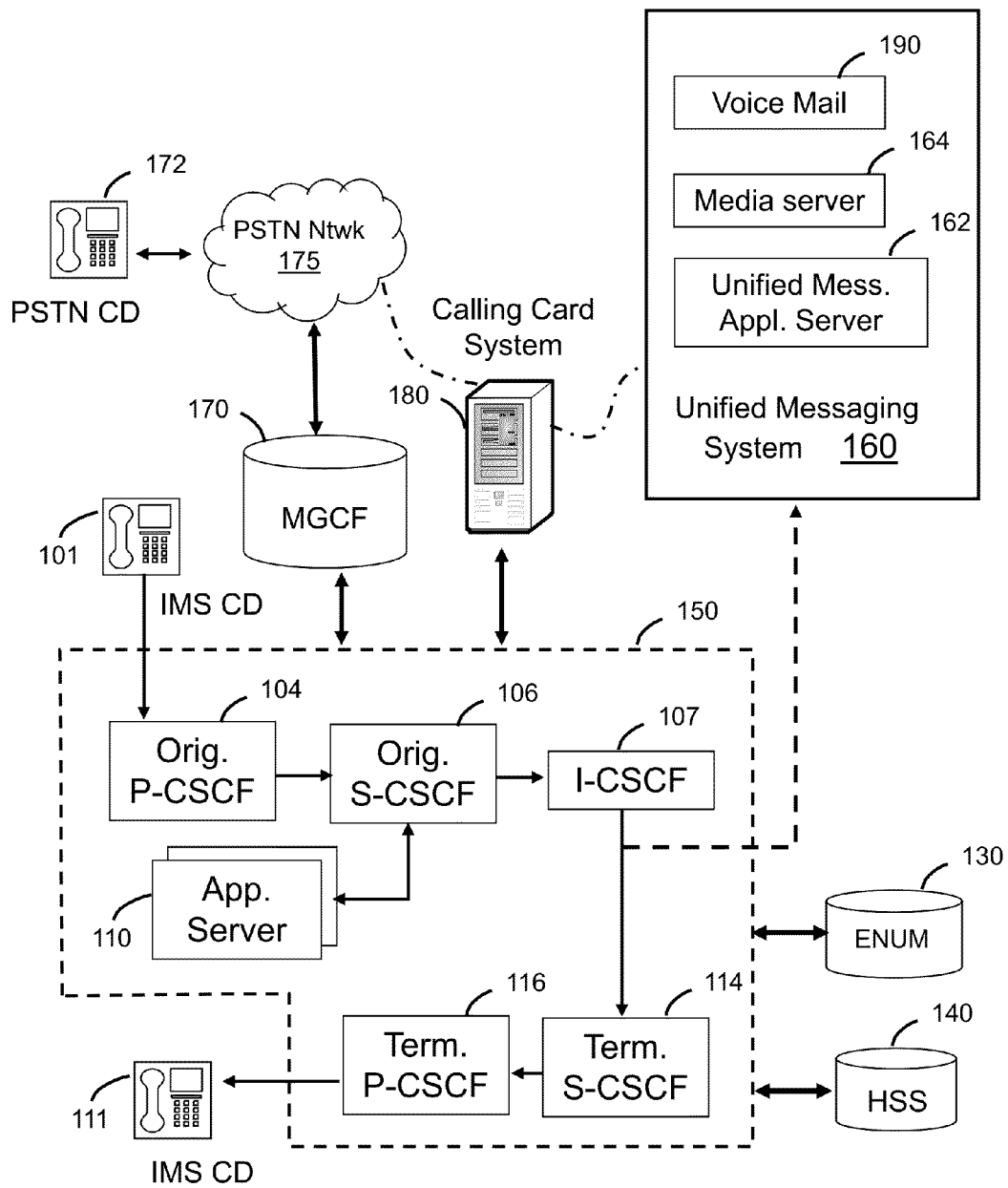
FIG. 1 depicts an exemplary embodiment of a communication system.

FIG. 1 depicts an exemplary communication system 100. The communication 100 can comprise a Home Subscriber Server (HSS) 140, a tElephone NUmber Mapping (ENUM) server 130, and common network elements of an IP Multimedia Subsystem (IMS) network 150. The IMS network 150 can be coupled to IMS communication devices such as an IMS-compliant phone 111, or an IMS-compliant Unified Messaging System (UMS) 160 that provides unified messaging services such as voicemail, email, fax, and so on to subscribers of the IMS network 150.

The UMS 160 can comprise a unified messaging application server 162 that utilizes common computing technologies to manage operations of one or more media servers 164. The media server 164 can be used as an off-the-shelf server (e.g., a Linux or Unix server) that performs media processing functions on media streams received from the IMS network 150 that may require the resources of digital signal processors (DSPs) for encoding and decoding the media. The UMS can call on the media server 164 to perform signal detection, such as Dual Tone Multi-Frequency (DTMF) signal processing, among other things, if necessary.

The UMS 160 can include an IMS compliant voicemail (VM) system 190. The VM system 190 can include an interactive voice response system (IVR) for interacting with the calling and called parties utilizing voice and keyed input signals (e.g., DTMF tones), and for processing callback messages supplied by the calling party according to a call flow design.

A Calling Card System (CCS) 180 can be communicatively coupled to the UMS 160 by way of the IMS network 150. The CCS 180 may or may not be IMS compliant, though it can perform SIP messaging operations. The CCS 180 can also include an Interactive Voice Response (IVR) system, or other suitable interface systems. The CCS 180 can include technology for processing calling card information to help a user place a call, for example via DTMF dialing, voice recognition, or other form of automata. The CCS 180 and the VM 190 can be provisioned to interact cooperatively to support services of the UMS 160.

Communications within the communication system 100 can conform to any number of signaling protocols such as a session initiation protocol (SIP), or a video communications protocol such as H.323 which combines video and voice over a packet-switched network, as well as cryptographic protocols, such as transport layer security (TLS) or secure sockets layer (SSL), to provide secure communications for data transfers.

The MGCF 170 can conform to a media gateway control protocol (MGCP) also known as H.248 defined by work groups in the Internet Engineering Task Force (IETF). This protocol can handle signaling and session management needed during a multimedia conference. The protocol defines a means of communication that converts data from the format required for a circuit-switched network to that required for a packet-switched network. For example, the MGCF 170 converts PSTN signals to IMS compliant signals and vice-versa by common transcoding techniques. MGCP can therefore be used to set up, maintain, and terminate calls between multiple disparate network elements of the communication system 100. For example, PSTN phones such as reference 172 can be accessed by the IMS network 150 by way of MGCF 170 coupled to the PSTN network 175 through for example one or more ISDN User Part (ISUP) trunks.

To establish a communication session between devices, the IMS network 150 can utilize an originating Serving Call Session Control Function (S-CSCF) 106. The originating S-CSCF 106 can submit queries to the ENUM server 130 to translate an E.164 telephone number to a SIP Uniform Resource Identifier (URI) if the targeted communication device is IMS compliant. If the targeted communication device is a PSTN device such as reference 172, the ENUM server 130 will respond with an unsuccessful address resolution and the originating S-CSCF 106 will forward the call to the MGCF 170 which connects the call through the PSTN network 175 using common signaling means such as SS7.

In the case where the ENUM server 130 returns a SIP URI, the SIP URI is used by an Interrogating CSCF (I-CSCF) 107 to submit a query to the HSS 140 to identify a terminating S-CSCF 114 associated with a targeted IMS communication device such as IMS CD 111. Once identified, the I-CSCF 107 can submit the SIP INVITE message to the terminating S-CSCF 114 which then identifies a terminating P-CSCF 116 associated with the targeted communication device. The P-CSCF 116 can then signal the communication device to establish communications. When the targeted IMS communication device is the UMS 160, the HSS 140 can identify a session border controller (not shown) associated with the UMS. The I-CSCF 107 will then establish communications with the UMS 160 by way of the session border controller. The aforementioned process can be symmetrical. Accordingly, the terms "originating" and "terminating" in FIG. 1 can be interchanged.

In addition to the network elements shown for the IMS network 150, there can be a number of application servers 110 which can provide a variety of services to IMS subscribers. For example, the application server 110 can be used to perform originating treatment functions on the calling party number received by the S-CSCF 106 in the SIP INVITE message. Originating treatment functions can include determining whether the calling party number has international calling services, and/or is requesting special telephony features (e.g., *72 forward calls, *73 cancel call forwarding, etc.).

Although not shown, a cellular network can be communicatively coupled to the PSTN network 175 to expand the reach of the IMS network 150 to portable communication devices operating according to a number of wireless access technologies such as GSM-GPRS, EDGE, CDMA-1X, UMTS, WiMAX, UWB, software defined radio (SDR), and so on.

Figure 2:
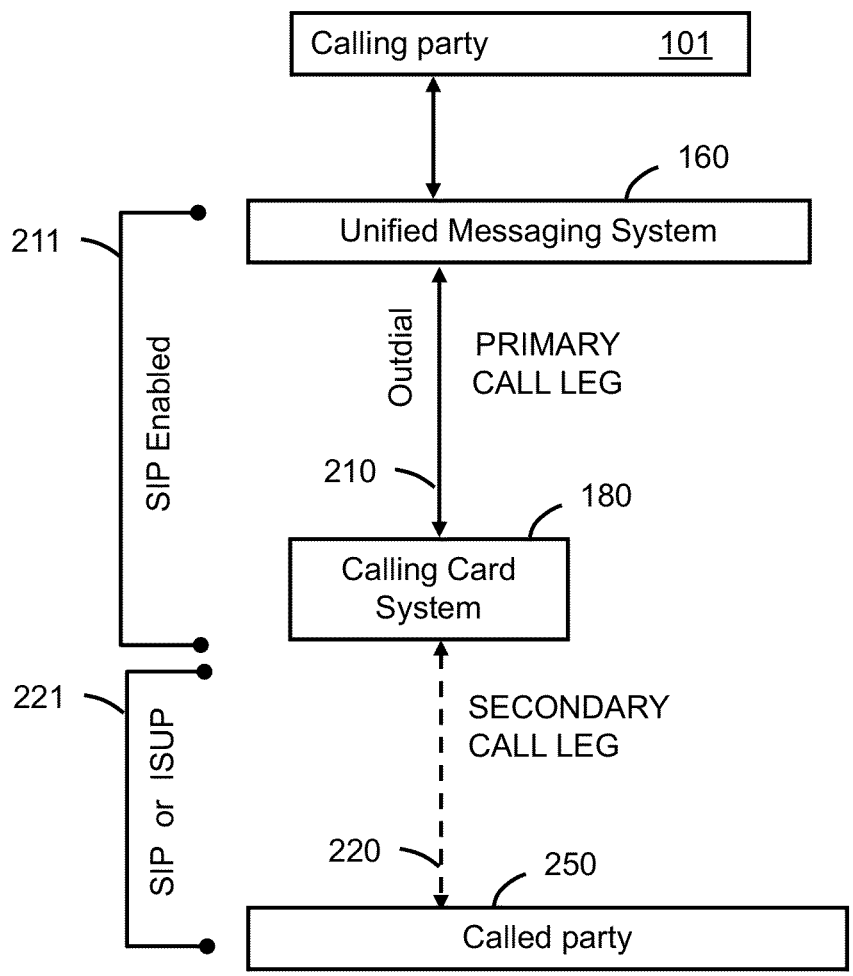
FIG. 2 depicts an exemplary diagram for conveying call status in the communication system.
Figure 3:
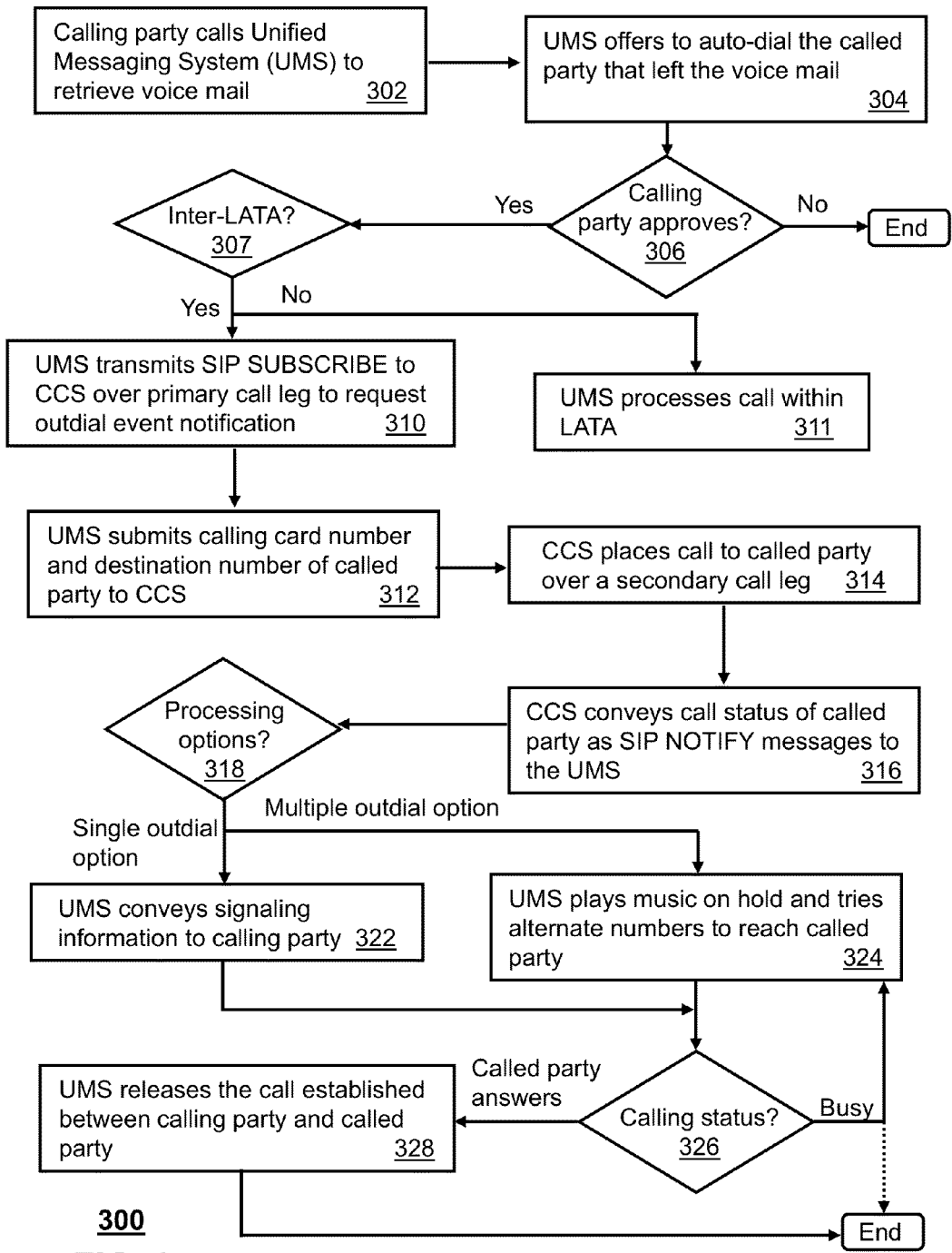
FIG. 3 depicts a flowchart illustrating an exemplary method operating in portions of the communication system.

FIG. 2 depicts an exemplary illustration for end-to-end signaling in the communication system 100 between a calling party 101, the UMS 160, the CCS 180 and a called party end point 250. The primary leg 210 establishing communications between the UMS 160 and the CCS 180 can be SIP enabled 211, while a secondary leg 220 establishing communications between the CCS and the called party 250 can be SIP or ISUP enabled 221.

FIG. 2 depicts an exemplary method 300 operating in portions of the communication system 100. When describing method 300, references should be made to FIGS. 1, 2 and 4, although it is understood that method 300 can be implemented in other suitable embodiments. It should also be noted that method 300 can include more or less steps and is not limited to the order of steps shown.

With this in mind, method 300 can begin with step 302 in which a calling party 101 calls the UMS 160 to retrieve voice mail messages. While browsing voice mail messages, the UMS 160 can present the calling party 101 with an option to auto-dial in step 304 party 250 that left the voice message. The UMS 160 can identify the party 250 leaving the voice mail via caller identification (e.g., caller ID) retrieved by the UMS from signaling information. The calling party 101 can also provide the UMS 160 a phone number of the party 250 who left the voice mail message.

In yet another embodiment, the UMS 160 can select a call back number of party 250 from presence information retrieved by common means from a presence server which party 250 is subscribed to. In this latter embodiment, the UMS 160 can use identification information supplied in the voicemail message (e.g., caller ID) to identify the presence server of party 250 from for example a profile held by the UMS, and determine from the presence information retrieved from the presence server whether the caller ID is still the best way to reach party 250. If it is not, the UMS 160 can replace the caller ID with another communication identifier retrieved from the presence information to contact party 250.

If the calling party 101 does not accept auto-dial at step 306, the UMS 160 can continue to present calling options or end the call as directed by the calling party. If the calling party 101 at step 306 accepts auto-dial, the UMS 160 proceeds to step 307 where it determines if the caller ID or callback number results in an inter or intra Local Access and Transport Area (LATA) call. If it is an intra-LATA call, then the UMS 160 processes the call within its LATA over the IMS network 150 by common means. If the call is an inter-LATA call (i.e., between LATAs), the UMS proceeds to step 310 where it transmits a SIP INVITE message to establish communications with the CCS 180 over a primary call leg and transmits a SIP SUBSCRIBE message to the CCS to request outdial event notification (see FIGS. 2 and 411, 416 of FIG. 4).

The SIP SUBSCRIBE message can indicate that the calling party 101 wishes to receive information about the status of outdial events associated with a call placed by the CCS 180 to party 250. For example, the outdial event can identify call set-up, dial-tone, ringing, busy, connect, off-hook, alert, or other suitable call status indicators. To establish a call with party 250 (referred herein as the called party 250) which left the voice mail message, the UMS 160 can submit in step 312 to the CCS 180 a calling card number and destination number of the called party 250. This information can be conveyed by the UMS 160 to the CCS 180 with DTMF signals (see 420, FIG. 4). The destination number can be supplied as an E.164 telephone number, a SIP URI, or another suitable communication identifier. The CCS 180 can then use the destination number to place in step 314 the outdial call as a SIP INVITE message directed to the called party 250 over a secondary call leg (see 421, FIG. 4). It should be noted that the called party 250 in the present illustration can be an IMS-compliant device 111 or PSTN device 172 (see FIG. 1).

Figure 4:
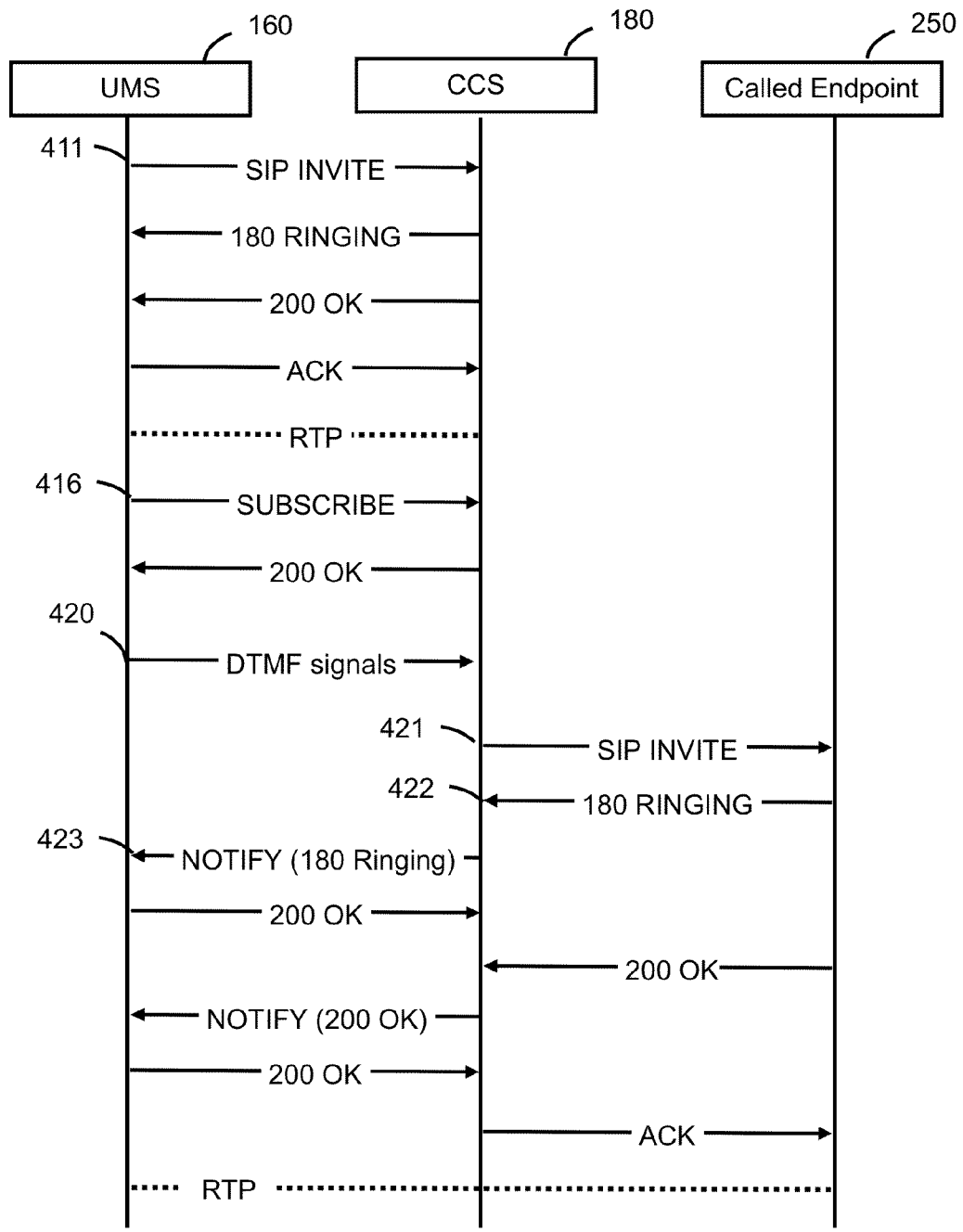
FIG. 4 depicts an exemplary flow diagram to illustrate the method of FIG. 3.

At step 316, the CCS 180 can convey to the UMS 160 via SIP NOTIFY messages call status received by the CCS on the secondary call leg. The CCS 180 can supply the UMS 160 with the SIP NOTIFY message which can include SIP provisional and/or final signaling messages such as 180 RINGING, 200 OK, or otherwise as defined by the Internet Engineering Task Force (IETF) in Request For Comments (RFC) 3261. For example, as shown in FIG. 4, the CCS 180 can receive 180 ringing messages (see 422) from the called endpoint 250 which it can convey to the UMS as SIP NOTIFY (ringing) messages (see 423). The UMS 160 at step 318 can utilize the signaling information supplied in the SIP NOTIFY message to implement desired application logic.

For example, if the UMS 160 has only a caller ID or a single callback number to reach the called party 250, the UMS can proceed to step 322 where it conveys the signaling information it receives from the CCS 180 over SIP NOTIFY messages to the calling party's IMS CD (or PSTN CD). In this scenario, if the called party answers the call in step 326, the UMS 160 can release the call established between the calling party and the called party in step 328. If on the other hand, the called party number is busy, the UMS 160 can provide the calling party other options (e.g., send email), or can end the call as requested by the calling party. Interactions between the calling party and the UMS 160 can be conducted by an interactive voice response system of the VM 190 that processes voice responses of the calling party and/or DTMF selections.

Referring back to step 318, if the UMS 160 has for example multiple outdial alternatives (e.g., a home number and an office number of the called party), the UMS can proceed to step 324 where it conveys music on hold to the calling party while it attempts the alternate numbers to reach the called party. If the called party answers the call in step 326, then the UMS 160 remove the music on hold status and releases the call in step 328 as previously described. If the called party does not answer in step 326 the first number dialed by the CCS 180 or the number is busy, the UMS 160 can transmit to the CCS in step 324 a new destination number to attempt. Since the CCS 180 has been directed in step 310 to provide outdial event notification, the UMS 160 does not need to resubmit a SIP SUBSCRIBE message to request the event notification service. Additionally, since the CCS 180 already has the calling card information of the calling party, this information does not have to be resubmitted by the UMS 160 as in step 312.

If the called party answers the alternate number in step 326, the UMS 160 releases the call in step 328. If the alternate number is busy, the UMS 160 can provide alternate communication options (e.g., email, paging, instant messaging, etc.), or can end the call as directed by the calling party.

Method 300 thus provides the UMS 160 a means to make informed decisions as to how to process signaling information received from the called party Upon reviewing the embodiments disclosed, it would be evident to an artisan with ordinary skill in the art that said embodiments can be modified, reduced, or enhanced without departing from the scope and spirit of the claims described below. For example, method 300 can be applied to a plurality of intermediate systems or IVRs such as CCS 180. Accordingly, SIP SUBSCRIBE messages including a request for outdial events can be submitted to a sequence of intermediate nodes of the communication system 100 to monitor the status of signaling information received by these intermediate nodes based on SIP NOTIFY messages supplied by said nodes.

Other suitable modifications can be applied to the present disclosure without departing from the scope of the claims below. Accordingly, the reader is directed to the claims for a fuller understanding of the breadth and scope of the present disclosure.

Figure 5:
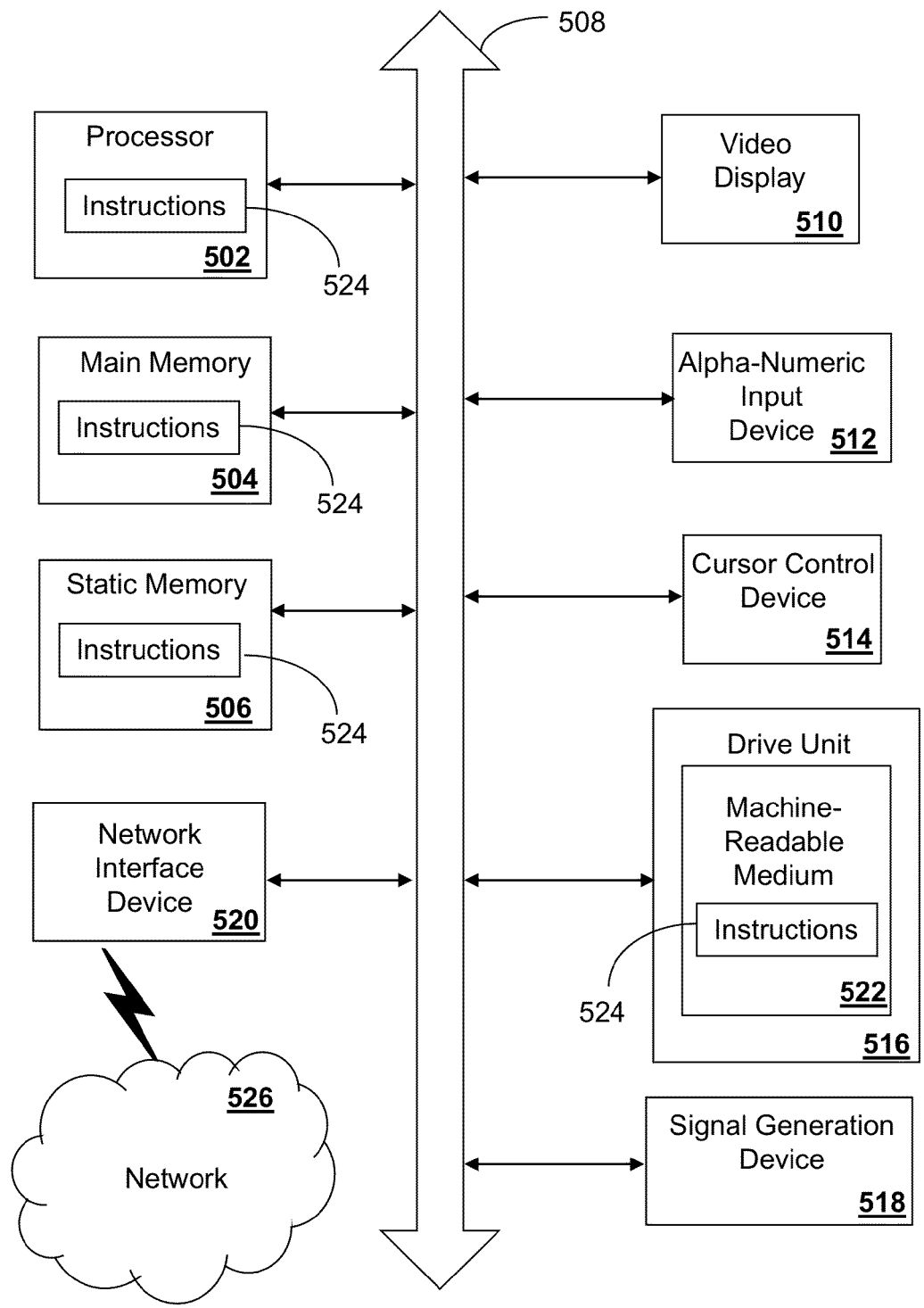
FIG. 5 depicts an exemplary diagrammatic representation of a machine in the form of a computer system within which a set of instructions, when executed, may cause the machine to perform any plurality of the methodologies disclosed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to email or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory machine-readable storage medium, comprising executable instructions which, responsive to being executed by a processor, cause the processor to facilitate performance of operations comprising:

receiving from a unified messaging system a session initiation protocol subscribe message over a primary call leg requesting outdial event notification on a secondary call leg responsive to the unified messaging system placing a call outside of its local access and transport area, wherein the unified messaging system operates in an internet protocol multimedia subsystem network, and wherein the primary and the secondary call legs bypass the internet protocol multimedia subsystem network;

placing a call on the secondary call leg responsive to receiving, on the primary call leg, outdial information from the unified messaging system, wherein receiving the outdial information is responsive to an autodial request to a voicemail message of the unified messaging system, and wherein the outdial information is directed towards a calling party of the voicemail message; and submitting a session initiation protocol notify message to the unified messaging system that indicates outdial events associated with call status of the call on the secondary call leg; and responsive to the call on the secondary leg being unanswered:

receiving alternative outdial information directed to the calling party of the voicemail message; and placing another call on the secondary leg responsive to receiving the alternative outdial information, wherein the placing of the other call does not require receiving from a unified messaging system another session initiation protocol subscribe message over the primary call leg requesting outdial event notification on the secondary call leg, wherein a calling card server performs session initiation protocol messaging associated with one of the session initiation protocol notify message or the session initiation protocol subscribe message, and wherein the call is placed on a voice over internet protocol network that produces the outdial events.

2. The non-transitory machine-readable storage medium of claim 1, wherein the outdial information comprises one of an E.164 telephone number or a uniform resource indicator.

3. The non-transitory machine-readable storage medium of claim 1, wherein the outdial event comprises one of a session initiation protocol provisional response, a session initiation protocol final response or a combination thereof.

4. The non-transitory machine-readable storage medium of claim 3, wherein the session initiation protocol provisional and final responses are defined by the Internet Engineering Task Force in request for comments 3261.

5. The non-transitory machine-readable storage medium of claim 1, wherein a calling card server corresponds to an interactive voice response system.

6. The non-transitory machine-readable storage medium of claim 1, wherein the outdial information is responsive to presence information of the calling party of the voicemail message.

7. A unified messaging system, comprising:
a memory that stores executable instructions; and
a processor coupled to the memory, wherein the processor, responsive to executing the instructions, facilitates performance of operations comprising:
submitting to a calling card server over a primary call leg a session initiation protocol subscribe message requesting outdial event notification for a call on a secondary call leg responsive to an autodial request to a caller identification associated with a calling party of a voicemail message of the unified messaging system, and wherein the call on the secondary call leg is directed to said caller identification, wherein the unified messaging system operates in an internet protocol multimedia subsystem network, and wherein the primary and the secondary call legs bypass the internet protocol multimedia subsystem network;
receiving over the primary call leg a session initiation protocol notify message from the calling card server indicating outdial events associated with placing the call over the secondary call leg;
responsive to the call on the secondary leg directed to said caller identification being unanswered:
determining an alternative destination number of the calling party of the voicemail message; and
initiating another call on the secondary leg responsive to alternative destination number, wherein the initiating of the other call does not require receiving from a unified messaging system another session initiation protocol subscribe message over the primary call leg requesting outdial event notification on the secondary leg;
submitting a session initiation protocol invite message to establish communications with the calling card server over the primary call leg,
wherein the session initiation protocol invite message comprises outdial information to place the call over the secondary call leg; and
receiving session initiation protocol notify messages from the calling card server regarding call status associated with the call when placed over the secondary call leg.

8. The unified messaging system of claim 7, wherein the outdial information comprises one among an E.164 telephone number and a uniform resource indicator.

9. The unified messaging system of claim 7, wherein the calling card server is communicatively coupled to a public switched telephone network.

10. The unified messaging system of claim 7, wherein the operations further comprise transmitting, to the calling card server, dual tone multi-frequency signals corresponding to a calling card number and destination number to direct the calling card server to place the call over the secondary leg.

11. The unified messaging system of claim 7, wherein the outdial event comprises one of a session initiation protocol provisional response, a session initiation protocol final response or a combination thereof.

12. The unified messaging system of claim 7, wherein the operations further comprise:
transmitting the session initiation protocol subscribe message to the calling card server responsive to a subscriber of the unified messaging system replying to a voicemail message;
identifying a party leaving the voicemail message; and
determining a telephone number to reach the party from presence information associated with the party.

13. The unified messaging system of claim 7, wherein the operations further comprise contacting the calling card server when placing a call outside of its local access and transport area.

14. The unified messaging system of claim 7, wherein the operations further comprise obtaining the caller identification from a presence server.

15. A calling card system, comprising:
a memory that stores executable instructions; and
a processor coupled to the memory, wherein the processor, responsive to executing the instructions, facilitates performance of operations comprising:
transmitting a session initiation protocol notify message to a unified messaging system over a primary call leg, wherein the session initiation protocol notify message includes call status associated with a secondary call leg, wherein the unified messaging system operates in an internet protocol multimedia subsystem network, and wherein the primary and the secondary call legs bypass the internet protocol multimedia subsystem network;
initiating a call on the secondary call leg responsive to an autodial request to a caller identification of a calling party of a voicemail message received from the unified messaging system in response to the voicemail message presented by the unified messaging system, wherein the caller identification of the calling party is obtained from outdial information associated with the voicemail message;
responsive to the call on the secondary leg being unanswered:
determining another autodial request to an alternative destination number of the calling party of the voicemail message; and
initiating another call on the secondary leg responsive to the alternative destination number, wherein the initiating of the other call does not require receiving from a unified messaging system another session initiation protocol subscribe message over the primary call leg requesting outdial event notification on the secondary leg;
receiving, from the unified messaging system, the outdial information associated with the voicemail message; and
receiving a session initiation protocol subscribe message requesting the call status on the secondary call leg.

16. The calling card system of claim 15, wherein the voicemail message comprises a calling card number, the outdial information associated with the voicemail message comprising one of an E.164 telephone number or a uniform resource indicator.

17. The calling card system of claim 15, wherein the operations further comprise being contacted by the unified messaging system when the unified messaging system places a call outside of its local access and transport area.

18. The calling card system of claim 15, wherein the operations further comprise establishing communications over the secondary call leg with a called endpoint comprising one among a voice over internet protocol client and a public switched telephone network client.

19. The calling card system of claim 15, wherein the call status comprises one of a session initiation protocol provisional response, a session initiation protocol final response or a combination thereof.

20. The calling card system of claim 15, wherein the operations further comprise receiving a call back number of a calling party of the voicemail message, the call back number responsive to presence information of the calling party.

* * * * *